United States Patent
Hidaka

(10) Patent No.: US 10,567,604 B2
(45) Date of Patent: Feb. 18, 2020

(54) IMAGE FORMING APPARATUS, PRINTING METHOD, AND NON-TRANSITORY RECORDING MEDIUM

(71) Applicant: Konica Minolta, Inc., Tokyo (JP)

(72) Inventor: Hiroki Hidaka, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/257,879

(22) Filed: Jan. 25, 2019

(65) Prior Publication Data
US 2019/0245994 A1 Aug. 8, 2019

(30) Foreign Application Priority Data
Feb. 7, 2018 (JP) ................ 2018-020319

(51) Int. Cl.
*H04N 1/00* (2006.01)
*G06K 15/12* (2006.01)
*G06F 3/12* (2006.01)

(52) U.S. Cl.
CPC ....... *H04N 1/00604* (2013.01); *G06F 3/1285* (2013.01); *G06K 15/12* (2013.01); *H04N 1/0009* (2013.01); *H04N 1/0066* (2013.01)

(58) Field of Classification Search
CPC ......... H04N 2201/0094; H04N 1/0057; H04N 1/00037; H04N 1/00082; H04N 2201/3222; G06F 3/1285; G06F 3/1221; G06F 3/1229; G06F 3/1213; G06F 3/1219; G06F 3/1274; B41J 13/0009; Y02D 10/1592; G06K 15/1809; G06K 15/401

USPC ......................................... 358/498
See application file for complete search history.

(56) References Cited

U.S. PATENT DOCUMENTS

| 2008/0014002 A1* | 1/2008 | Edamatsu | B41J 11/008 400/76 |
| 2009/0244623 A1* | 10/2009 | Kurohata | G03G 15/5062 358/1.16 |
| 2010/0134838 A1* | 6/2010 | Nakamura | G03G 15/50 358/1.15 |
| 2011/0058882 A1* | 3/2011 | Umeda | B41J 11/009 400/582 |
| 2014/0154030 A1* | 6/2014 | Kimura | B42B 4/00 412/1 |
| 2014/0293344 A1* | 10/2014 | Umezawa | G03G 15/5016 358/1.15 |

(Continued)

FOREIGN PATENT DOCUMENTS

JP 03-195641 A 8/1991

*Primary Examiner* — Negussie Worku
(74) *Attorney, Agent, or Firm* — Osha Liang LLP

(57) ABSTRACT

An image forming apparatus includes a hardware processor. The hardware processor: receives page setting information in print data of a next page; stores the page setting information in a second memory at the time of receiving the print data of the next page from the external apparatus when a first memory has no area to store image information of the next page; and controls a conveyer to feed out the sheets from a paper feed tray specified by the page setting information to a conveyance path of the conveyer and to convey the sheets when the page setting information is in the second memory at the timing of feeding out the next sheet to the conveyance path of the conveyer regardless of whether the image information corresponding to the page setting information is in the first memory.

24 Claims, 9 Drawing Sheets

(56) References Cited

U.S. PATENT DOCUMENTS

| | | | |
|---|---|---|---|
| 2017/0023898 A1* | 1/2017 | Harano | G03G 15/50 |
| 2017/0223210 A1* | 8/2017 | Yamada | H04N 1/00973 |
| 2018/0292985 A1* | 10/2018 | Hidaka | G05B 19/182 |
| 2018/0341213 A1* | 11/2018 | Hidaka | G03G 15/6567 |
| 2019/0235812 A1* | 8/2019 | Mori | G06F 3/1205 |

* cited by examiner

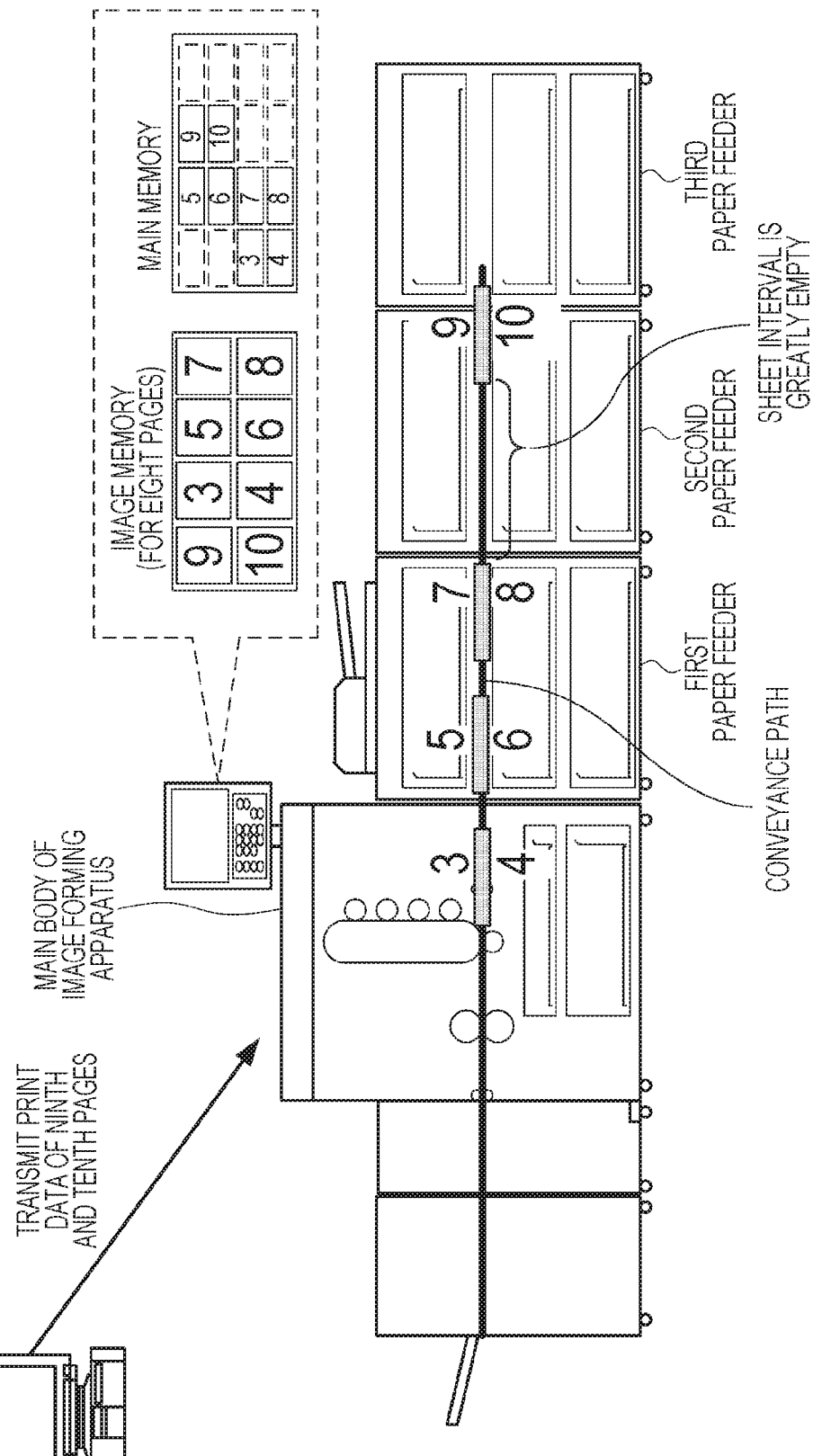

IMAGE FORMING APPARATUS, PRINTING METHOD, AND NON-TRANSITORY RECORDING MEDIUM

CROSS-REFERENCE TO RELATED APPLICATIONS

The entire disclosure of Japanese patent Application No. 2018-020319, filed on Feb. 7, 2018, is incorporated herein by reference in its entirety.

BACKGROUND

Technological Field

The present invention relates to an image forming apparatus, a printing method, and a non-transitory recording medium having a conveyance mechanism capable of conveying a plurality of sheets in a side-by-side aligned manner in a conveyance direction in a conveyance path from a paper feed tray to an image former.

Description of the Related Art

An image forming apparatus such as a production printer sequentially executes printing on the basis of received print data while successively receiving the print data of each page from an external image input apparatus that generates image information by performing RIP processing. The print data of each page includes image information and page setting information, and the page setting information includes information that can specify a paper feed tray of a paper feed source of sheets used for printing the image information.

In the related art, transmission of the print data from the external image input apparatus to the image forming apparatus is performed by transmission of a combination of the page setting information and the image information. In addition, at the timing when the next sheet is transmitted from the paper feed tray to a conveyance path, in a case where both the image information to be printed on the sheet and the page setting information for specifying the paper feed source of the sheet have been received and aligned, the image forming apparatus operates to feed out the next sheet from the paper feed tray to the conveyance path.

By the way, in an apparatus such as a production printer which performs a large amount of printing at a high speed, a plurality of paper feed trays are provided in order to reduce the menial labor of frequently refilling the paper feed tray with sheets.

As a technique for efficiently switching paper feeding from a plurality of paper feed trays, JP 3-195641 A discloses a printing apparatus capable of switching trays without waiting for completion of printing on sheets already fed in the case of switching the paper feed tray.

When the number of paper feed trays increases, a conveyance distance from the paper feed tray farthest away from a main body to the main body becomes long, so that when the sheets are arranged on the conveyance path within a predetermined sheet interval that can secure productivity, the number of sheets that can exist on the conveyance path increases. As described above, in order to feed out the next sheet on the conveyance path, it is necessary that the print data (both the page setting information and the image information) of the page to be printed on the sheet has been received and aligned. On the other hand, in order to cope with a jam or the like, it is necessary to retain the received print data until the printing is completed. For this reason, as the number of sheets existing on the conveyance path increases, more memory is required to retain the received print data until the printing is completed.

There may be enough memory for retaining the print data. However, due to the request to reduce the memory mounted on the apparatus, in some cases, the capacity of the memory for storing the print data is reduced to be smaller than the capacity that can cope with the maximum number of sheets that can exist on the conveyance path. In this case, at the timing of feeding out the next sheet from the paper feed tray to the conveyance path, since the print data of the page to be printed on the next sheet is not yet stored in the memory, the next sheet cannot be fed, so that the productivity may be lowered.

FIGS. 7 to 9 illustrate examples in which productivity is decreased due to insufficiency of a memory for storing print data. The image forming apparatus stores the image information in the print data received from the external image input apparatus in a dedicated image memory, and stores the page setting information in a portion of the main memory in which various types of information are stored. In the configuration, although the conveyance path can convey maximum five sheets (ten pages printed by double sided printing) in a side-by-side aligned manner, the image memory can only store image information corresponding to maximum eight pages.

As illustrated in FIG. 7, when four sheets (sheets on which one to eight pages are printed during the double sided printing) are being conveyed on the conveyance path, the image memory retains the image information of one to eight pages, so that the image memory has already become memory full. In this state, even if there is a request for transmission of the print data of the ninth page from the external image input apparatus, the image forming apparatus has to refuse to receive the print data because there is no empty area in the image memory. As a result, even at the timing of feeding the fifth sheet on the conveyance path, since the print data of the ninth page and the tenth page has not been stored yet, the feeding of the next sheet is temporarily stopped.

FIG. 8 illustrates a communication sequence at the time of transmitting print data from an external image input apparatus to the image forming apparatus and illustrates a case where the print data is temporarily refused to be received due to an insufficient memory. The image input apparatus performs making a request for transmission of the print data by transmitting the page setting information. In a case where there is a necessary amount of an empty area in the memory, the image forming apparatus returns a response of OK to the page setting information received from the image input apparatus, and the image input apparatus receiving the response transmits the image information of the page to the image forming apparatus. The image forming apparatus which succeeded in receiving the image information returns the reception OK of the image information to the external apparatus.

On the other hand, if there is no necessary amount of an empty area in the memory of the image forming apparatus, the image forming apparatus returns NG to the page setting information received from the external apparatus. The external apparatus which received the response of NG does not transmit the image information but re-transmits the same page setting information as the previous time. In this example, since the image memory becomes full as a result of receiving and storing the image information of the eighth page, when the image forming apparatus receives the page setting information of the ninth page from the external apparatus, the image forming apparatus returns NG as a response.

After that, if the printing of the image information of one and two pages is completed and the memory area in which the image information of these pages has been stored is opened, the image forming apparatus returns a response of OK with respect to the page setting information of the ninth page received from the external apparatus and receives the image information of the page.

When the reception of the print data is resumed in this manner and the image information of the ninth and tenth pages is stored in the image memory, the image forming apparatus performs (resumes) feeding of the next sheet.

In the image forming apparatus, when the paper feeding is temporarily stopped, the sheets that have already been on the conveyance path continue to be conveyed downstream until the paper feeding is resumed. Therefore, when the paper feeding is resumed, as illustrated in FIG. 9, a large sheet interval is generated between the newly fed sheet (sheet on which the ninth and tenth pages are printed) and the preceding sheet, so that the productivity is decreased by that much.

SUMMARY

One or more embodiments of the present invention provide an image forming apparatus, a printing method, and a non-transitory recording medium capable of preventing productivity from decreasing by feeding a next sheet to a conveyance path even in a case where image information on next page cannot be received and stored due to an insufficient memory.

According to one or more embodiments of the present invention, an image forming apparatus comprises: a receiver that receives print data including image information and page setting information that can specify a paper feed tray of sheets on which the image information is to be printed from an external apparatus; a first memory that stores the received image information; a second memory that can store the page setting information of the number of pages larger than the number of pages in which the first memory can store the image information; an image former that forms an image on the sheets on the basis of the image information read from the first memory; a plurality of paper feed trays that accommodate the sheets; a conveyance mechanism that conveys the sheets fed out from the paper feed tray to the image former and can convey a plurality of the sheets in a side-by-side aligned manner in a conveyance direction between the paper feed tray farthest away from the image former and the image former; and a hardware processor that receives the page setting information in the print data of a next page and stores the page setting information in the second memory at the time of receiving the print data of the next page from the external apparatus in a case where there is no empty area capable of storing the image information of the next page in the first memory, and feeds out the sheets from the paper feed tray specified by the page setting information to a conveyance path of the conveyance mechanism and conveys the sheets if the page setting information specifying the paper feed tray of the paper feed source of the sheets at the timing of feeding out the next sheet to the conveyance path of the conveyance mechanism is in the second memory regardless of whether or not the image information corresponding to the page setting information is in the first memory.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a diagram illustrating an example in which productivity is decreased due to an occurrence of a large sheet interval caused by paper feeding delay occurring due to insufficiency of the image memory in the image forming apparatus in the related art.

DETAILED DESCRIPTION

Hereinafter, one or more embodiments of the present invention will be described with reference to the drawings. However, the scope of the invention is not limited to the disclosed embodiments.

Figure 1:
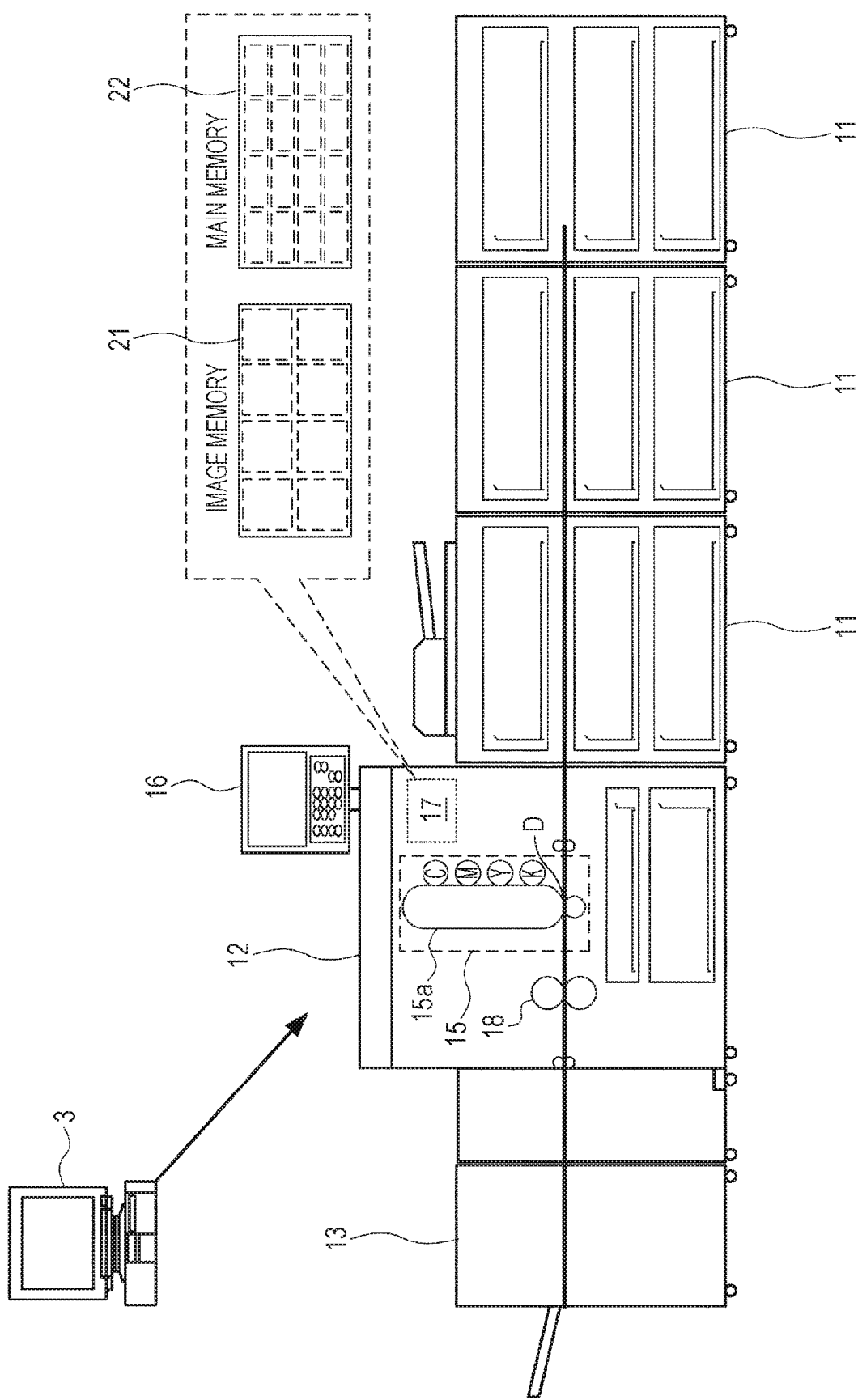
FIG. 1 is a diagram illustrating an outer appearance of an image forming apparatus according to one or more embodiments of the present invention.

FIG. 1 is an external diagram illustrating a schematic configuration of an image forming apparatus 10 according to one or more embodiments of the present invention. The image forming apparatus 10 is an apparatus having a function of receiving print data from an external image input apparatus 3 such as a personal computer (PC) and forming (printing) an image on a sheet on the basis of the print data.

The image forming apparatus 10 includes a plurality of paper feeders 11 that accommodate sheets, a main body 12 that prints images on the sheets fed out from the paper feeder 11 and outputs the sheets, and a stacker 13 that stacks and accommodates the sheets output from the main body 12

The main body 12 includes an image former 15 that forms the image on the sheet, an operation panel 16 that receives user operations and displays various types of information, a control circuit board 17 that controls operations of the entire apparatus, and performs image processing, and the like.

Inside the image forming apparatus 10, there is provided a conveyance mechanism (conveyer) 14 that conveys the sheets fed out from the paper feed tray of the paper feeder 11 to the stacker 13 via the image former 15 of the main body 12.

The image former 15 forms a full-color toner image by superimposing the toner images for the colors of C, M, Y, and K using the image forming unit for the colors of C, M, Y, and K arranged along the intermediate transfer belt 15*a* wrapped endlessly in an annular shape, and the image former transfers the full-color toner image to a sheet conveyed by the conveyance mechanism 14 at a predetermined transfer position D. When passing through a fixer 18 provided downstream in the transfer position D, the toner image transferred onto the sheet is pressurized and heated to be fixed to the sheet.

Each of the paper feeders 11 has a plurality of paper feed trays (herein, three paper feed trays) and has a function of feeding out the sheets accommodated in the paper feed tray for which an instruction is given from the main body 12 on the conveyance path of the conveyance mechanism 14.

The conveyance mechanism 14 can convey a plurality of sheets (in this example, five sheets) in a side-by-side aligned manner in the conveyance direction on the conveyance path between the paper feed tray farthest away from the image former 15 and the image former 15.

The print data input from the external image input apparatus 3 includes image information and page setting information. The image information is an image data generated through RIP, and the page setting information is information including information (sheet type, sheet size, and the like) that can specify the paper feed tray of the sheets on which the image information is to be printed.

The control circuit board 17 of the main body 12 includes an image memory (first memory) 21 for retaining the image information of the print data and a main memory (second memory) 22 for storing the page setting information. In this case, the image information of maximum eight pages can be stored in the image memory 21 (the page capacity of the first memory). Due to the request to reduce the capacity of the image memory 21, the maximum number of pages (eight pages in this example) that can store the image information in the image memory 21 is smaller than the number of pages (ten pages in this example) to be printed on both sides of the maximum number of sheets (five sheets in this example) that the conveyance mechanism 14 can convey at one time in a side-by-side aligned manner on the conveyance path between the paper feed tray farthest away from the image former 15 and the image former 15.

The main memory 22 can store the page setting information of the number of pages larger than the number of pages which can store the image information in the image memory 21. In this case, the page setting information for sixteen pages can be stored in the main memory 22 (the page capacity of the second memory). The number of pages is equal to or larger than the number of pages to be printed on both sides of the maximum number of sheets that can be conveyed by the conveyance mechanism 14 in a side-by-side aligned manner on the conveyance path between the paper feed tray farthest away from the image former 15 and the image former 15 and is equal to or larger than the number of pages necessary for securing the productivity of the image forming apparatus 10.

Figure 2:
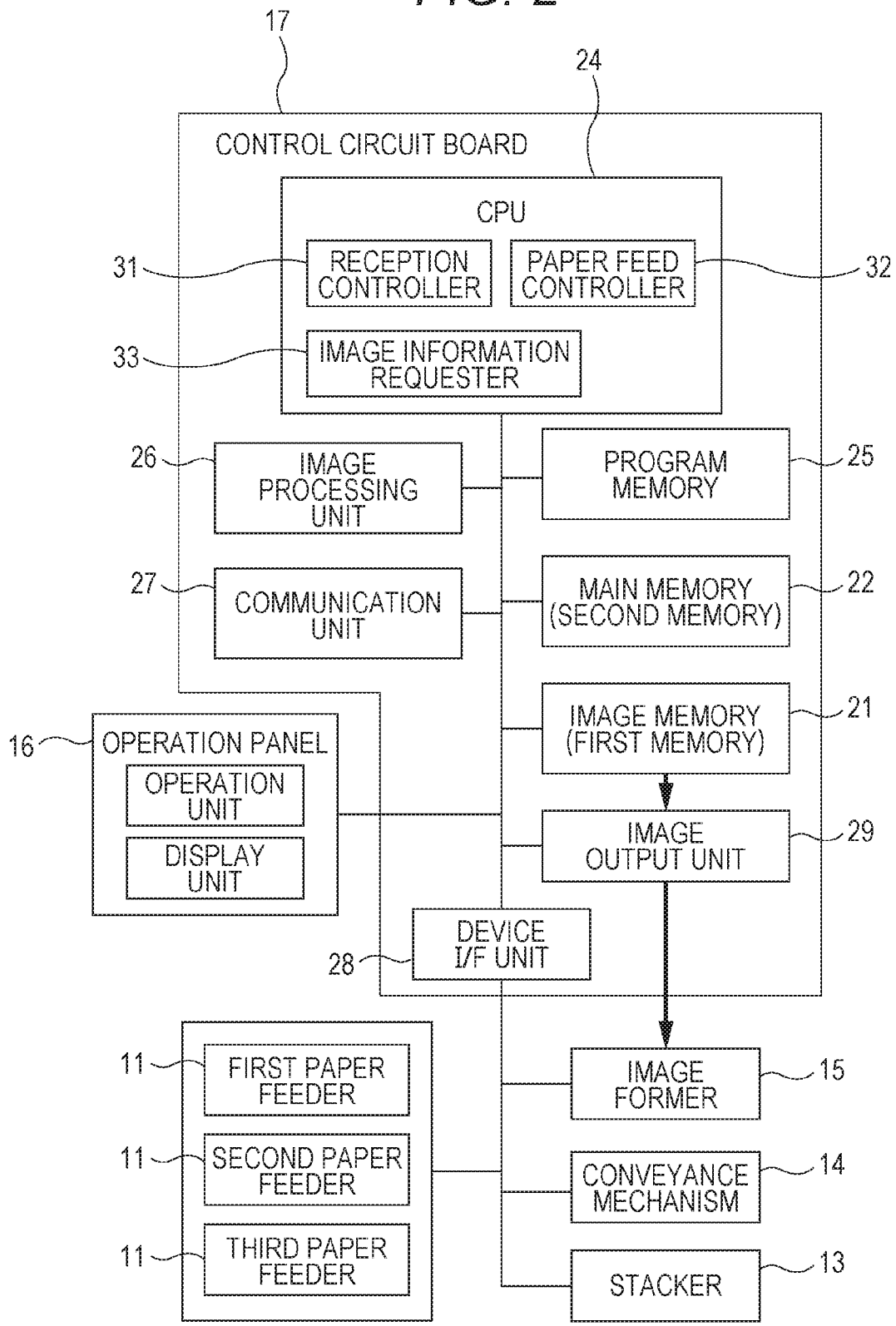
FIG. 2 is a block diagram illustrating an electrical configuration of the image forming apparatus according to one or more embodiments of the present invention.

FIG. 2 is a block diagram illustrating an electrical configuration of the image forming apparatus 10. The control circuit board 17 has a Central Processing Unit (CPU) 24. A program memory (non-transitory recording medium) 25, the image memory 21, the main memory 22, an image processing unit 26, a communication unit 27, a device I/F unit 28, an image output unit 29, the operation panel 16, and the like are connected to the CPU 24 via a bus. The CPU 24 operates according to a program stored in the program memory 25.

The main memory 22 is a random access memory for temporarily storing various data when the CPU 24 operates. A portion of the main memory 22 is used as a storage area of the above-described page setting information.

The image output unit 29 performs functions of sequentially reading the image information stored in the image memory 21 in accordance with the image formation timing in the image former 15 and outputting the image information to an image forming unit of the image former 15.

The image processing unit 26 executes processing such as enlargement/reduction for the image information. The communication unit 27 has a function of communicating with the image input apparatus 3 and other external apparatus. The communication unit 27 is used for receiving print data transmitted from the image input apparatus 3 and transmitting various requests and notifications to the image input apparatus 3.

The operation panel 16 includes a display unit for displaying an operation screen, a setting screen, and the like and an operation unit for receiving various operations from the user.

The image former 15, the conveyance mechanism 14, the paper feeder 11, and the stacker 13 are connected to the device I/F unit 28. These units operate by receiving various instruction commands from the CPU 24 of the control circuit board 17 via the device I/F unit 28, and notify the CPU 24 of the control circuit board 17 of operation states and the like via the device I/F unit 28.

By executing the program stored in the program memory 25, the CPU 24 performs functions of a reception controller 31, a paper feed controller 32, an image information requester 33, and the like.

The reception controller 31 controls reception of the print data transmitted from the image input apparatus 3. When receiving the print data of the next page from the image input apparatus 3, the reception controller 31 checks whether or not there is a necessary empty area in the image memory 21. If there is a necessary empty area, both the image information and the page setting information included in the print data are controlled to be received. The received image information is stored in the image memory 21, and the page setting information is stored in the main memory 22.

On the other hand, when receiving the print data of the next page from the image input apparatus 3, if there is no empty area capable of storing the image information of the next page in the image memory 21, the reception controller 31 refuses to receive (rejects) the image information in the print data of the next page and receives the page setting information to store the page setting information in the main memory 22. That is, in a case where there is no empty area in the image memory 21, the reception controller 31 controls so that only the page setting information is precedingly received from the image input apparatus 3.

In addition, after performing refusing to receive the image information, the reception controller 31 notifies the image input apparatus 3 of a request for reception of the page setting information of the remaining pages of the job including the page that is refused to be received and performs precedingly receiving the page setting information one after another for the remaining pages of the current job regardless of the empty area of the image memory 21.

Furthermore, when there is a next job to be received from the image input apparatus 3 after receiving the page setting information of all the remaining pages of the current job including the page of which reception has been refused, the image input apparatus 3 is notified of the request for reception of the page setting information of the page related to the next job regardless of the empty situation of the image memory 21. That is, when there is a next job waiting for transmission on the image input apparatus 3 side, the preceding reception of the page setting information is also performed for the next job.

However, in a case where the page setting information corresponding to a predetermined number of pages has been precedingly received, new notification of the request for reception of the page setting information is stopped. The predetermined number of pages is the number of pages that can secure the productivity of the image forming apparatus 10. More specifically, when the page setting information enough to maintain the state where the maximum number of sheets are conveyed in a side-by-side aligned manner between the paper feed tray farthest away from the image former 15 and the image former 15 is being precedingly received, the notification of the request for reception of the page setting information to the image input apparatus 3 is stopped.

The paper feed controller 32 controls feeding-out of the sheets from the paper feed tray of the paper feeder 11 to the conveyance mechanism 14. If the page setting information specifying the paper feed tray of the paper feed source of the sheets exists in the main memory 22 at the timing of feeding out the next sheet to the conveyance path of the conveyance mechanism 14, the paper feed controller 32 performs control to feed out the sheets from the paper feed tray specified by the page setting information to the conveyance path of the conveyance mechanism 14 irrespective of whether or not the image information corresponding to the page setting information is stored in the image memory 21.

The image information requester 33 performs a function of transmitting an request for acquisition of the image information that has not been received to the external image input apparatus 3 when an empty area capable of storing the image information of the new page is generated (emerged) in the image memory 21 (an area in which the image information of the page has been stored is opened due to the completion of the printing of a certain page to generate an empty area) in a state where the page setting information of the page of which the image information has not been received (not stored in the image memory 21) exists in the main memory 22.

In addition, in an empty area capable of storing the image information of the next new page in the image memory 21 after the image information corresponding to the request for acquisition is stored in the image memory 21, the image information requester 33 performs a function of transmitting the request for acquisition of the image information that has not been received again to the external image input apparatus 3 when the state where the page setting information of the page for which the image information has not been received (not stored in the image memory 21) exists in the main memory 22 continues.

In addition, when the printing of one page is completed by the image former 15, the CPU 24 opens the area in which the page setting information of the page has been stored from the main memory 22 and also opens the area in which the image information of the page has been stored from the image memory 21.

Figure 3:
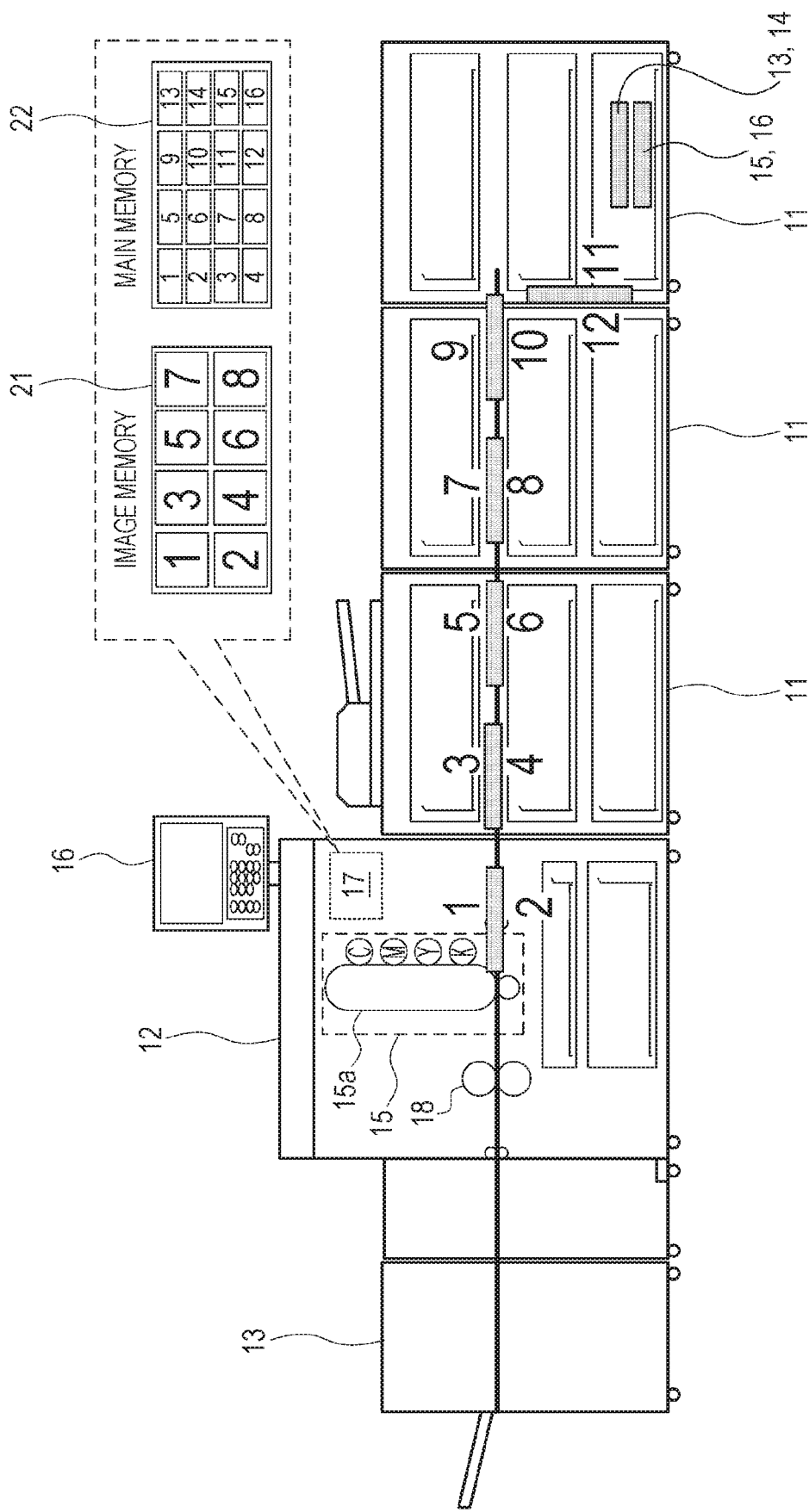
FIG. 3 is a diagram illustrating one or more embodiments of the image forming apparatus in a state where page setting information has been precedingly received in a state where an image memory becomes memory full and image information of a next page cannot be received.

FIG. 3 illustrates one or more embodiments of the image forming apparatus 10 that has precedingly received the page setting information in a state where the image memory 21 becomes memory full and image information of the next page cannot be received. Since the image memory 21 has already stored the image information corresponding to the eight pages and becomes memory full, the image information of the pages from the ninth page refused to be received and is in a state where the image information has not been received. However, since the page setting information of the pages (ninth to sixteenth pages in this example) from the ninth page has been precedingly received, the sheets are fed from a specific paper feed tray on the conveyance path of the conveyance mechanism 14 on the basis of the precedingly received page setting information, so that the sheet interval is not unnecessarily spread, and the productivity is maintained.

Figure 4:
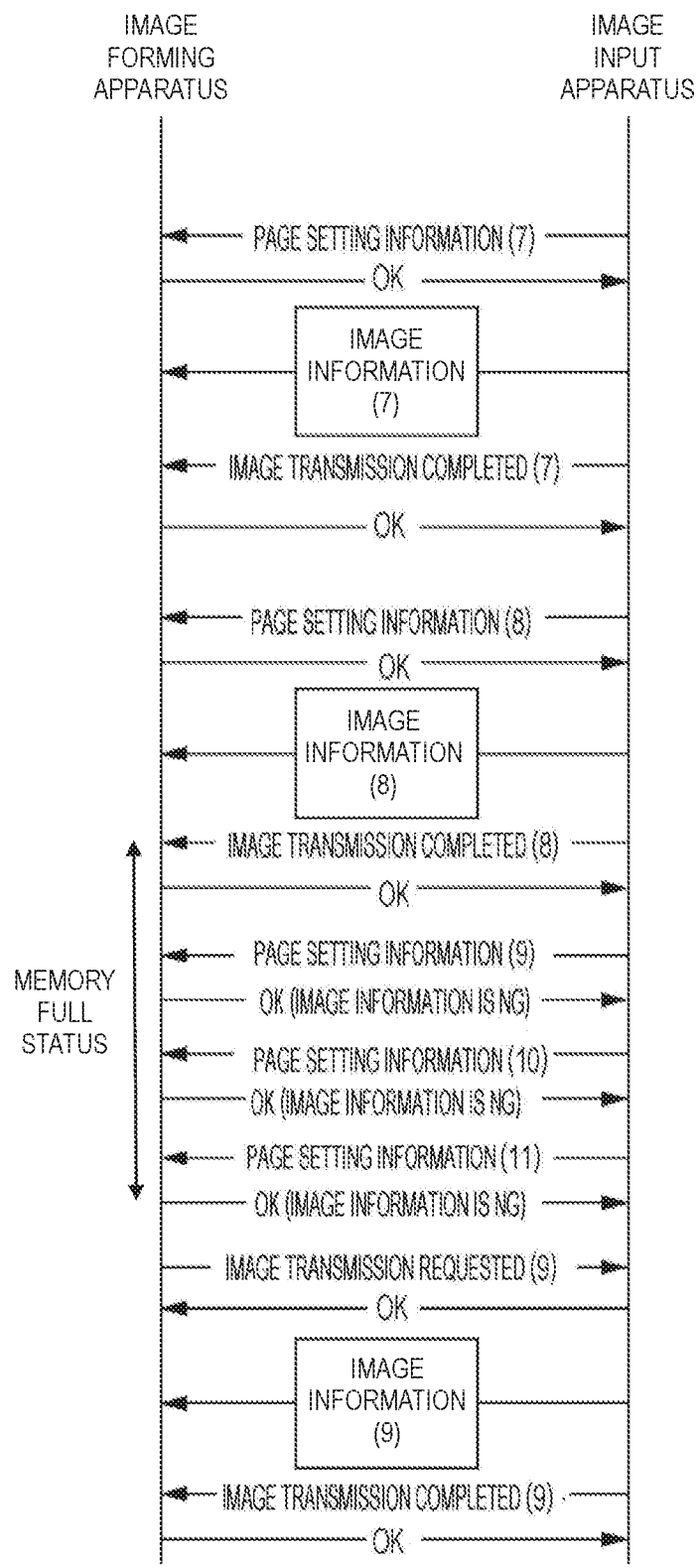
FIG. 4 is a diagram illustrating one or more embodiments of a communication sequence when the image forming apparatus receives print data from an image input apparatus.

FIG. 4 illustrates one or more embodiments of a communication sequence in which the image forming apparatus 10 receives the print data from the image input apparatus 3. FIG. 4 illustrates a communication sequence from the vicinity where the print data of the seventh page of FIG. 3 is received.

In a case where the image input apparatus 3 transmits the print data of one page to the image forming apparatus 10, the image input apparatus 3 first transmits the page setting information of the page to the image forming apparatus 10.

The image forming apparatus 10 that has received the page setting information determines whether or not there is an empty area capable of storing the image information of a new page in the image memory 21. If there is a necessary empty area, the image forming apparatus returns a response of "OK" to the image input apparatus 3. If there is no necessary empty area, the image forming apparatus returns a response of "image information NG" to the image input apparatus 3.

In a case where the image input apparatus 3 has received the response of "OK", the image input apparatus 3 transmits the image information of the page corresponding to the previously transmitted page setting information to the image forming apparatus 10. If the image forming apparatus 10 normally receives the image information, the image forming apparatus 10 returns a response "OK" to the image input apparatus 3. If there is a next page to be transmitted, the image input apparatus 3 also transmits the print data in the same communication sequence as described above with respect to the next page.

On the other hand, in a case where the image input apparatus 3 has received a response of "image information NG" indicating refusal to receive the image information from the image forming apparatus 10, the image input apparatus 3 transmits the page setting information of the next page to the image forming apparatus 10 while suspending the transmission of the image information of the page corresponding to the previously transmitted page setting information.

In one or more embodiments of FIG. 3, with respect to the seventh page and the eighth page, since there is an empty area capable of storing the image information of the next page in the image memory 21, the image information of the page is received subsequently to the page setting information. In a case where the image forming apparatus 10 receives the print data of the ninth page, since the image memory 21 is memory full, the image forming apparatus 10 returns the "image information NG" (refusal to receive the image information) as a response to the page setting information (9) received from the image input apparatus 3. The image input apparatus 3 that has received this transmits the page setting information (10) of the tenth page while suspending the transmission of the image information of the ninth page.

In one or more embodiments of FIG. 4, since the image memory 21 is memory full, with respect to the tenth page and the eleventh page, the image forming apparatus 10 returns a response of the "image information NG" (refusal to receive the image information) to the page setting information to the image input apparatus 3, and the page setting information of the tenth page and the eleventh page is precedingly received.

When an empty area capable of storing the image information of a new page is generated in the image memory 21, the image forming apparatus 10 transmits a request for acquisition ("image transmission request (9)") of the image information that has not been received to the image input apparatus 3. Upon receiving the request for acquisition, the image input apparatus 3 transmits the image information of the requested page to the image forming apparatus 10.

In one or more embodiments, the image forming apparatus 10 side manages the page of the image information that has not been received, and the request for acquisition specifying the page to be received next is transmitted from the image forming apparatus 10 to the image input apparatus 3. However, such a configuration may be used that the image input apparatus 3 side manages which page of which the image information has not been transmitted, and the image information of the earliest page (page that has transmitted the page setting information earliest) among the image information that has not been transmitted is transmitted to the image forming apparatus 10.

In addition, the communication sequence between the image input apparatus 3 and the image forming apparatus 10 is not limited to that illustrated in FIG. 4. For example, such a communication sequence may be used that, after refusing to receive the image information, the image forming apparatus 10 notifies the image input apparatus 3 of a request for transmission of the page setting information of the next page, and the image input apparatus 3 having received the notification transmits the page setting information of the corresponding page to the image forming apparatus 10.

Figure 5:
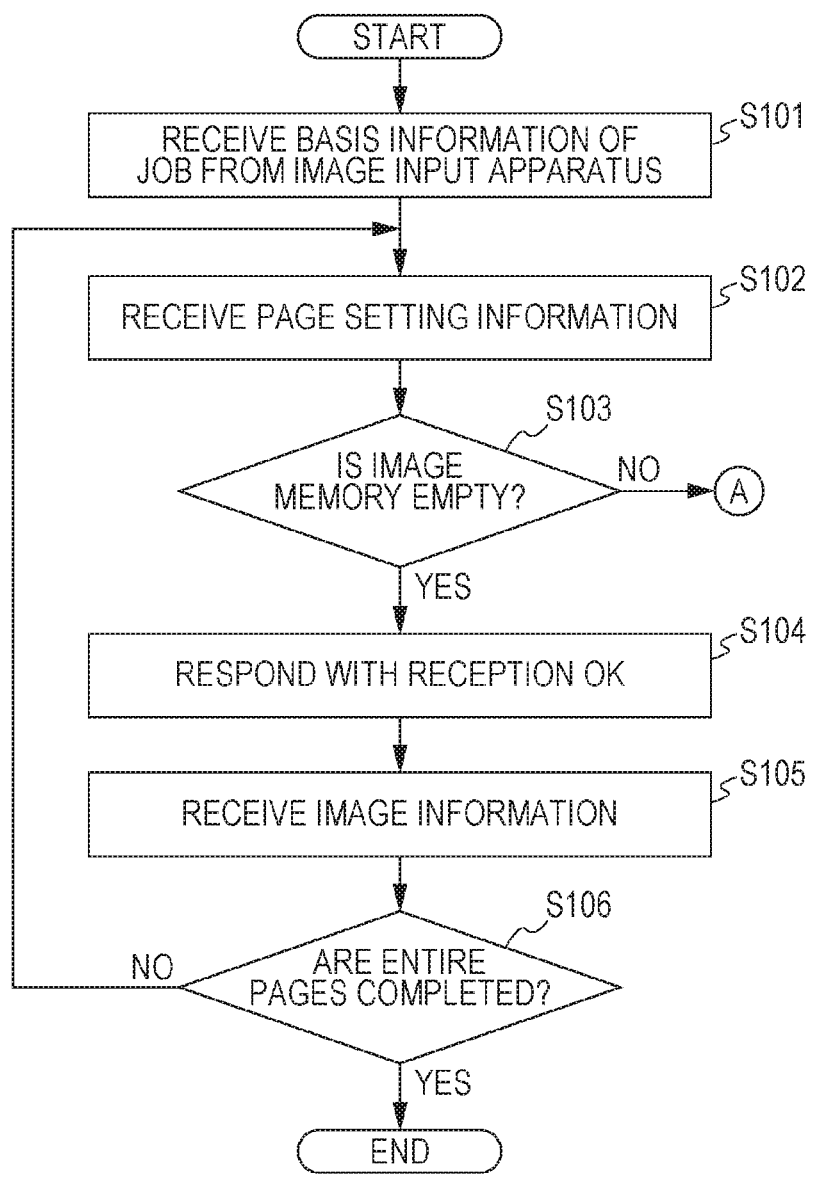
FIG. 5 is a flowchart illustrating one or more embodiments of operations of the image forming apparatus when receiving print data.
Figure 6:
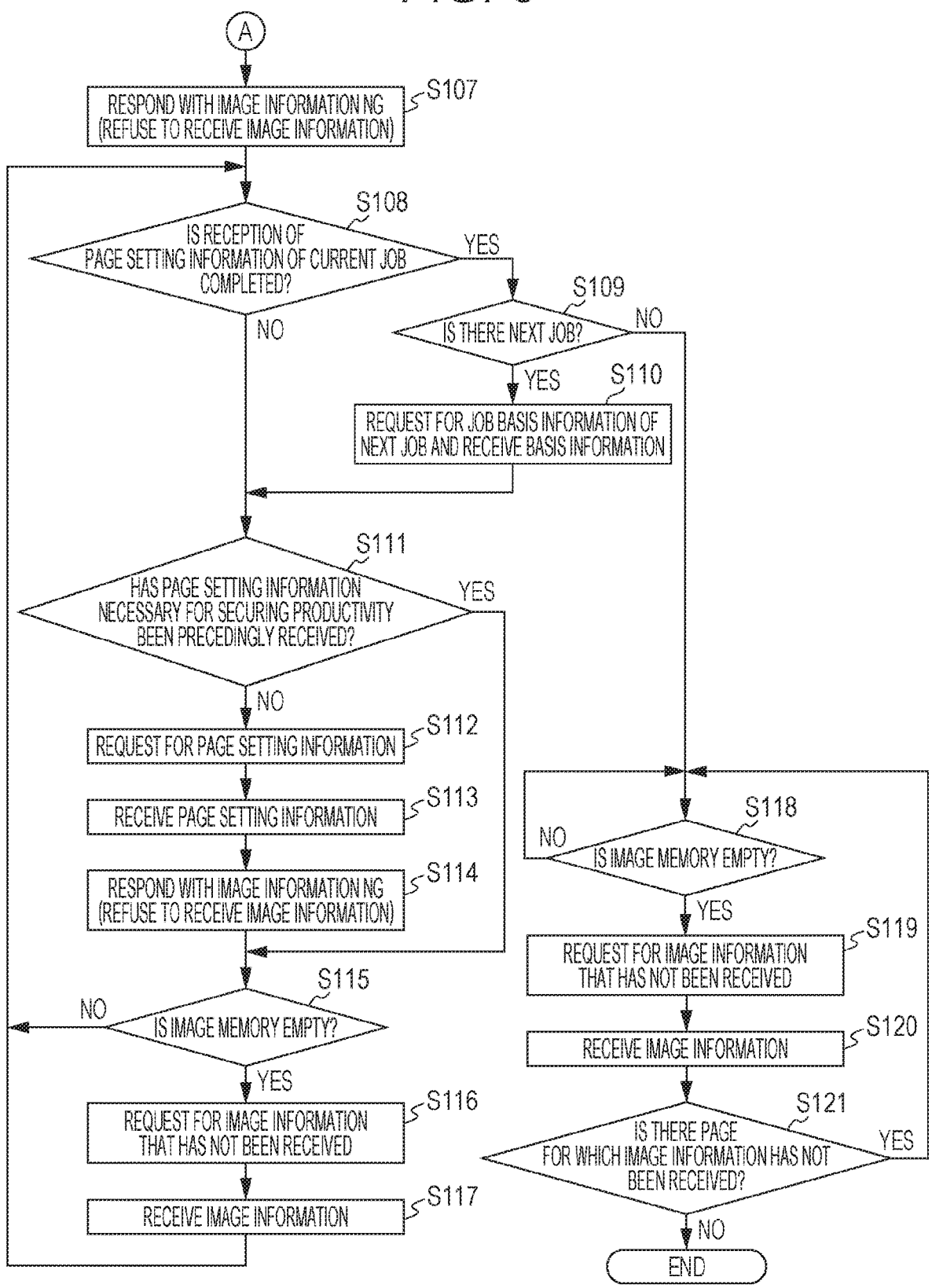
FIG. 6 is a flowchart illustrating the continuation of FIG. 5.
Figure 7:
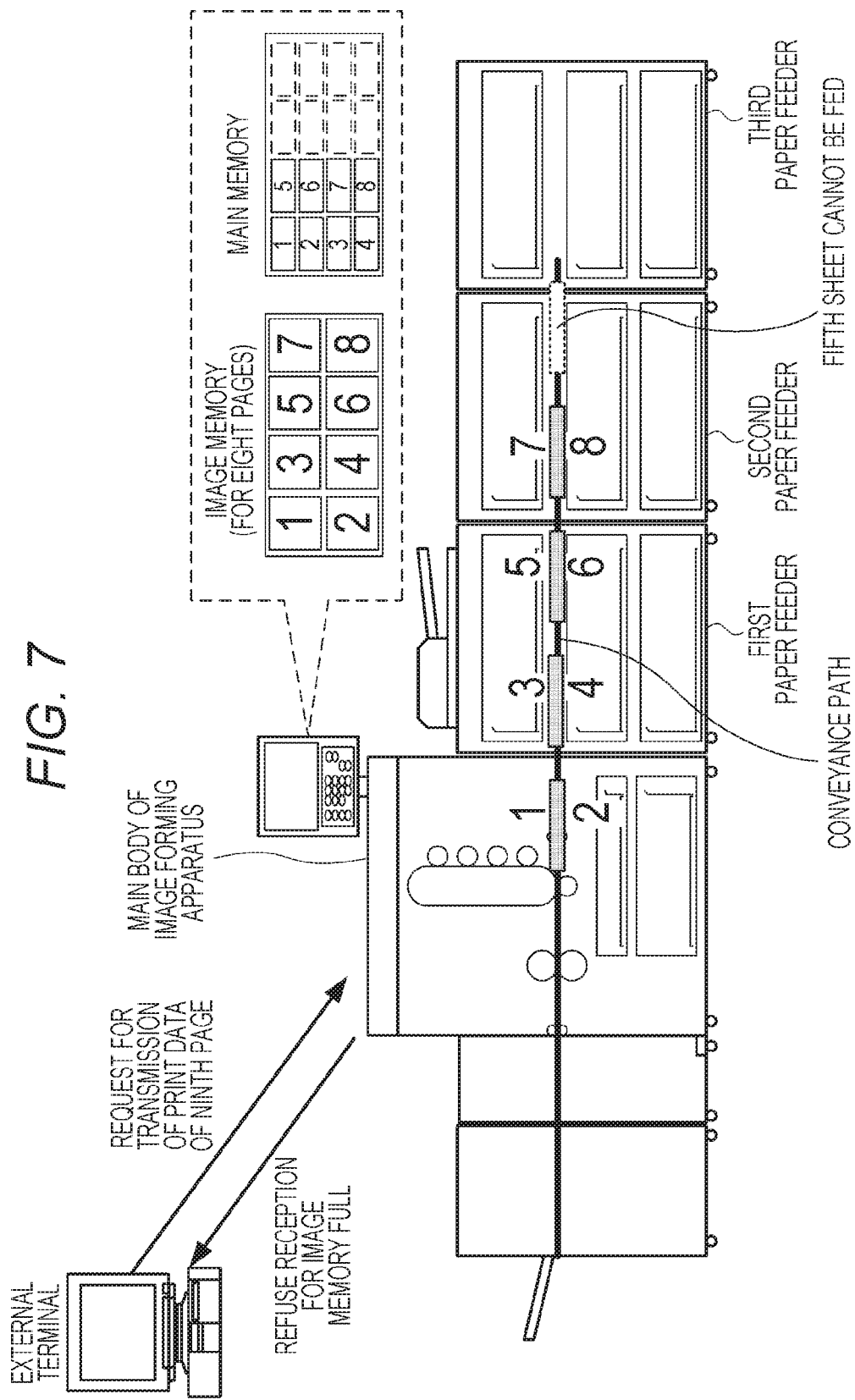
FIG. 7 is a diagram illustrating an example in which paper feeding from a paper feed tray is delayed due to insufficiency of an image memory in an image forming apparatus in the related art.
Figure 8:
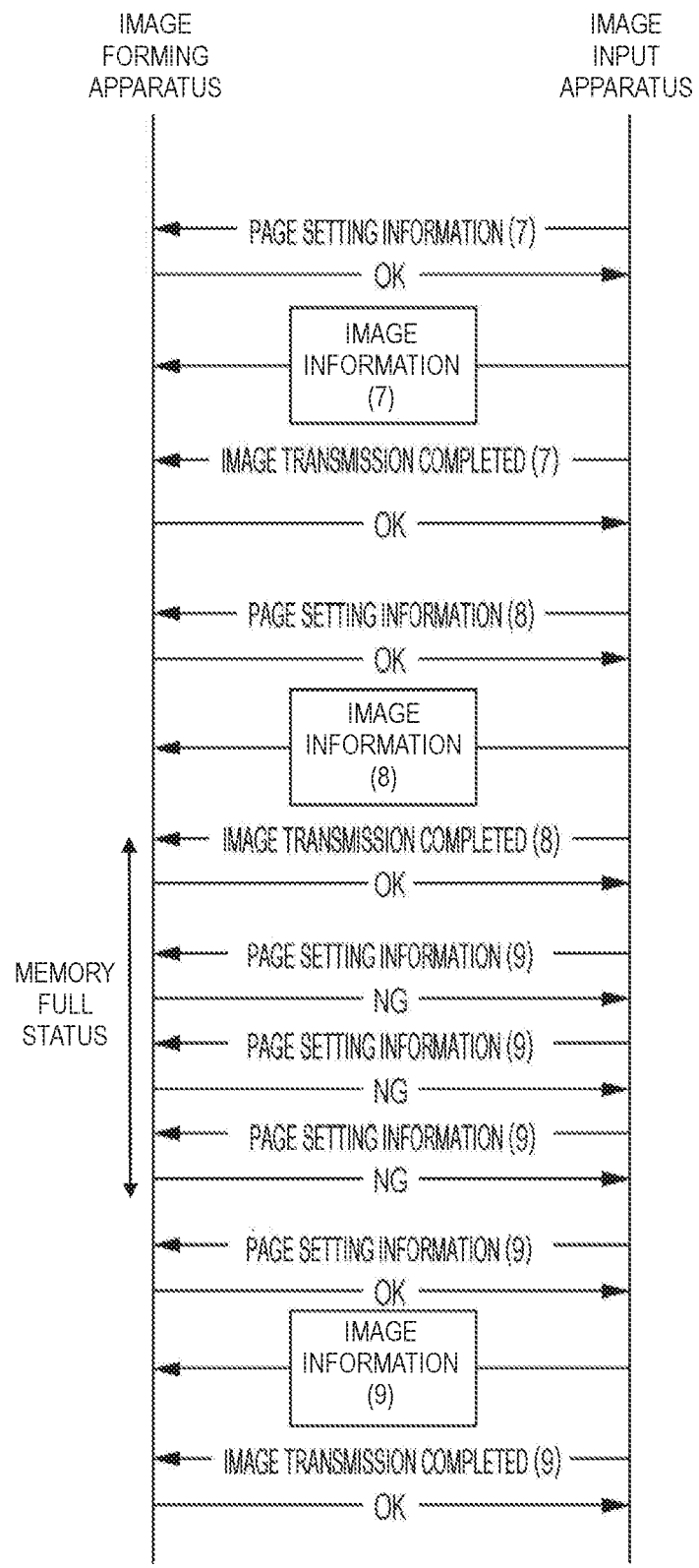
FIG. 8 is a diagram illustrating a communication sequence in a case where image information cannot be received from an image input apparatus due to insufficiency of the image memory in the image forming apparatus in the related art.

FIGS. 5 and 6 are flowcharts illustrating one or more embodiments of operations of the image forming apparatus 10 at the time of receiving print data. Herein, when transmitting the print data of one job, the image input apparatus 3 transmits the print data of each page after transmitting the basic information of the job. The basic information of the job includes various types of information related to the entire job.

The image forming apparatus 10 receives the basic information of the job from the external image input apparatus 3 (step S101), further successively receives the page setting information of the first page from the image input apparatus 3, and stores the page setting information in the main memory 22 (step S102). At this time, it is checked whether or not there is an empty area capable of storing the image information of the page in the image memory 21 (step S103). If there is a necessary amount of the empty area (step S103; Yes), a response of reception OK is returned to the image input apparatus 3 (step S104).

After that, the image information (image information of the page corresponding to the page setting information received in step S103) transmitted from the image input apparatus 3 which received the response of the reception OK is received and stored in the image memory 21 (step S105).

Then, it is determined whether or not the print data of all the pages of the current job has been received (step S106). If all the pages have been received (step S106; Yes), this process is ended.

In addition, when the timing of feeding out the next sheet to the conveyance mechanism 14 comes, if the page setting information capable of specifying the paper feed source of the next sheet exists in the main memory 22, the image forming apparatus 10 performs control of feeding out the sheets from the paper feed tray specified by the page setting information to the conveyance mechanism 14 irrespective of whether or not the image information corresponding to the page setting information is stored in the image memory 21.

In addition, the image forming apparatus 10 operates such that if the image information to be formed on the sheet is not prepared in the image memory 21 at the time when the sheet reaches the confirmation position just before the transfer position D, the image forming apparatus 10 temporarily stops the conveyance of the sheet at the above-described confirmation position, and after that, at the time when necessary image information is received and is prepared in the image memory 21, the conveyance of the sheet is resumed and an image is formed on the sheet.

In a case where there is no empty area capable of storing the image information of the page corresponding to the page setting information in the image memory 21 at the time of receiving the page setting information (step S103; No), the image forming apparatus 10 returns a response of the image information NG (refusal to receive the image information) to the image input apparatus 3 (step S107).

After that, the image forming apparatus 10 determines whether or not the page setting information of the current job has been received for all the pages (step S108). If there is page setting information of the current job that has not been received (step S108; No), it is determined whether or not the page setting information corresponding to the number of pages necessary for securing the productivity has already been precedingly received (step S111).

In a case where the page setting information corresponding to the number of pages necessary for securing the productivity has been precedingly received (step S111; Yes), the process proceeds to step S115.

If the page setting information corresponding to the number of pages necessary for securing the productivity has not precedingly been received (step S111; No), the image forming apparatus 10 transmits a request for reception of the page setting information to the image input apparatus 3 (step S112).

In this case, any of the following methods (a) and (b) may be employed.

(a) On the side of the image forming apparatus 10, on the basis of the received page setting information, it is specified which page of which job of the page setting information is to be received next, and information indicating the specified page in addition to the request for reception is transmitted to the image input apparatus 3. The image input apparatus 3 transmits the page setting information of the page designated by the request for reception to the image forming apparatus 10.

(b) The image forming apparatus 10 transmits a request for reception not designating a page to the image input apparatus 3. The image input apparatus 3 manages which page of which job of the page setting information has been transmitted, and when receiving a request for reception of the page setting information from the image forming apparatus 10, the page setting information to be transmitted next is specified by the image input apparatus 3 side, and the specified page setting information is transmitted to the image forming apparatus 10.

After transmitting the request for reception of the page setting information in step S112, the image forming apparatus 10 receives the page setting information transmitted from the image input apparatus 3 (step S113), returns a response of image information NG (refusal to receive the image information) to the image input apparatus 3 (step S114), and the process proceeds to step S115.

In step S115, it is determined whether or not an empty area capable of storing the image information of the new page is generated in the image memory 21. In a case where there is an empty area capable of storing the image information of the new page in the image memory 21 (step S115; Yes), the image forming apparatus 10 transmits a request for acquisition of the image information that has not been received to the image input apparatus 3 (step S116).

In this case, any of the following methods (c) and (d) may be employed.

(c) The image forming apparatus 10 side manages which page of which job with respect to the image information has been received, the page on which the image information is to be received next is specified by the image forming apparatus 10 side, and the information of the page in addition to the request for acquisition of the image information that has not been received is transmitted to the image input apparatus 3. The image input apparatus 3 transmits the image information of the page designated by the request for acquisition received from the image forming apparatus 10 to the image forming apparatus 10.

(d) The image forming apparatus 10 transmits a request for acquisition not designating a page to the image input apparatus 3.

The image input apparatus 3 manages which page of which job of the image information has been transmitted, and when receiving a request for acquisition of the image information that has not been received from the image forming apparatus 10, the page on which the image information is to be transmitted next is specified by the image input apparatus 3 side, and the image information of the specified page is transmitted to the image forming apparatus 10.

In step S115, if there is no empty area in the image memory 21 in which the image information of the new page can be stored (step S115; No), the image forming apparatus 10 returns to step S108 to continue the process.

In step S108, in a case where the reception of the page setting information of the current job has been completed (step S108; Yes), it is determined whether there is a next job waiting for transmission by the image input apparatus 3 (step S109). In a case where there is a next job (step S109; Yes), the image input apparatus 3 is requested for the job basic information of the next job, and in response to this request, the job basic information of the next job transmitted from the image input apparatus 3 is received (step S110). After that, the process proceeds to step S111 to continue the process.

If there is no next job (step S109; No), it is determined whether or not there is an empty area capable of storing the image information of the new page in the image memory 21 (step S118). In a case where there is no empty area capable of storing the image information of the new page in the image memory 21 (step S118; No), the image forming apparatus 10 returns to step S118 and waits for the generation of an empty area.

In a case where there is an empty area capable of storing the image information of the new page in the image memory 21 (step S118; Yes), the image forming apparatus 10 transmits a request for acquisition of the image information that has not been received to the image input apparatus 3 (step S119), and after that, the image forming apparatus receives the image information transmitted from the image input apparatus 3 and stores the image information in the image memory 21 (step S120). In steps S119 and S120, any of the methods (c) and (d) described above may be employed.

After receiving the image information, the image forming apparatus 10 determines whether or not there is still a page for which the image information has not been received (step S121). If there is a page for which the image information has not yet been received (step S121; Yes), the process returns to step S118 to continue the process. If there is no page for which the image information has not yet been received (step S121; No), this process is ended.

As described above, in the image forming apparatus 10 according to one or more embodiments, in a case where there is no empty area in the image memory 21, the image information is not received, and the page setting information is precedingly received. Therefore, at the timing of feeding out the next sheet to the conveyance mechanism 14, even if the image information to be printed on the next sheet is not received, it is possible to perform paper feeding while the paper feed tray of the paper feed source of the next sheet is specified on the basis of the precedingly received page setting information. As a result, the productivity of the image forming apparatus 10 can be maintained high by preventing occurrence of situations such as deterioration in productivity of the image forming apparatus 10 caused by delay in paper feeding due to waiting for reception of the image information.

In one or more embodiments, the image memory 21 and the main memory 22 are configured as physically separate memories. However, a configuration in which a portion of one memory is used as the image memory 21 and the other portion is used as the main memory 22 may also be applied.

Although embodiments of the present invention have been described and illustrated in detail, the disclosed embodiments are made for purposes of illustration and example only and not limitation. The scope of the present invention should be interpreted by terms of the appended claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus comprising:
   a receiver that receives print data including image information and page setting information that specifies a paper feed tray of sheets on which the image information is printed from an external apparatus;
   a first memory that stores the image information;
   a second memory that stores the page setting information, wherein a page capacity of the second memory is larger than a page capacity of the first memory;
   an image forming device that forms an image on each of the sheets based on the image information read from the first memory;
   a plurality of paper feed trays that accommodate the sheets;
   a conveyer that conveys the sheets from the paper feed tray to the image forming device, in a side-by-side aligned manner in a conveyance direction, between the image forming device and the paper feed tray that is farthest away from the image forming device; and
   a hardware processor that:

receives the page setting information in the print data of a next page;

stores the page setting information in the second memory at a time of receiving the print data of the next page from the external apparatus when the first memory has no area to store the image information of the next page; and controls the conveyer to feed out the sheets from the paper feed tray specified by the page setting information to a conveyance path of the conveyer when the page setting information for a next sheet is in the second memory, regardless of whether the image information corresponding to the page setting information is in the first memory.

2. The image forming apparatus according to claim 1, wherein the hardware processor rejects the image information in the print data of the next page at the time of receiving the print data of the next page from the external apparatus, when the first memory has no area to store the image information of the next page in the first memory.

3. The image forming apparatus according to claim 2, wherein after refusing to receive the image information, the hardware processor notifies the external apparatus of a request for reception of the page setting information of the remaining pages including the page that is refused to be received regardless of an area status of the first memory.

4. The image forming apparatus according to claim 3, wherein when there is a next job after receiving the page setting information of all the remaining pages of a job including the refused page, the hardware processor notifies the external apparatus of the request for reception of the page setting information related to the next job regardless of the area status of the first memory.

5. The image forming apparatus according to claim 3, wherein the hardware processor stops the notification of the request for reception of the page setting information in a case that the page setting information corresponding to a predetermined number of pages has been precedingly received.

6. The image forming apparatus according to claim 1, wherein the hardware processor transmits a first request for acquisition of the image information to the external apparatus when an area to store the image information of a new page is emerged in the first memory in a state where the image information that corresponds to the page setting information in the second memory has not been received.

7. The image forming apparatus according to claim 6, wherein the hardware processor transmits a second request for acquisition to the external apparatus when an area to store the image information of a next new page exists in the first memory after the image information corresponding to the first request for acquisition is stored and the state continues.

8. The image forming apparatus according to claim 1, wherein, upon receiving the print data from the external apparatus in a case where the first memory has an area to store the image information of the page corresponding to the received page setting information, the hardware processor notifies the external apparatus that the image information of the page is acceptable and receives the image information of the page from the external apparatus, and upon receiving the print data from the external apparatus in a case where the first memory has no area to store the image information of the page corresponding to the received page setting information, the hardware processor notifies the external apparatus of refusal to receive the image information of the page.

9. A printing method in an image forming apparatus that includes:

a receiver that receives print data including image information and page setting information that specifies a paper feed tray of sheets on which the image information is printed from an external apparatus;

a first memory that stores the image information;

a second memory that stores the page setting information, wherein a page capacity of the second memory is larger than a page capacity of the first memory;

an image forming device that forms an image on each of the sheets based on the image information read from the first memory;

a plurality of paper feed trays that accommodate the sheets; and a conveyer that conveys the sheets from the paper feed tray to the image forming device in a side-by-side aligned manner in a conveyance direction between the image forming device and the paper feed tray that is farthest away from the image forming device, the printing method comprising:

receiving the page setting information in the print data of a next page;

storing the page setting information in the second memory at a time of receiving the print data of the next page from the external apparatus when the first memory has no area to store the image information of the next page; and controlling the conveyer to feed out the sheets from the paper feed tray specified by the page setting information to the conveyance path of the conveyer and to convey the sheets when the page setting information for a next sheet is in the second memory, regardless of whether the image information corresponding to the page setting information is in the first memory.

10. The printing method according to claim 9, wherein in the receiving, the image information in the print data of the next page is rejected at the time of receiving the print data of the next page from the external apparatus, when the first memory has no area to store the image information of the next page in the first memory.

11. The printing method according to claim 9, further comprising transmitting a first request for acquisition of the image information to the external apparatus when an area to store the image information of a new page is emerged in the first memory in a state where the image information that corresponds to the page setting information in the second memory has not been received.

12. The printing method according to claim 11, wherein in the transmitting, a second request for acquisition is transmitted to the external apparatus when an area to store the image information of a next new page exists in the first memory after the image information corresponding to the first request for acquisition is stored and the state continues.

13. The printing method according to claim 9, wherein, in the receiving, upon receiving the print data from the external apparatus in a case where the first memory has an area to store the image information of the page corresponding to the received page setting information, the external apparatus is notified that the image information of the page is acceptable and receives the image information of the page from the external apparatus, and upon receiving the print data from the external apparatus in a case where the first memory has no area to store the image information of the page corresponding to the received page setting information, the external apparatus is notified of refusal to receive the image information of the page.

14. The printing method according to claim 10, wherein after refusing to receive the image information, the external apparatus is notified of a request for reception of the page setting information of the remaining pages including the page that is refused to be received regardless of an area status of the first memory.

15. The printing method according to claim 14, wherein in the receiving, when there is a next job after receiving the page setting information of all the remaining pages of a job including the refused page, the external apparatus is notified of the request for reception of the page setting information related to the next job regardless of the area status of the first memory.

16. The printing method according to claim 14, wherein in the receiving, the notification of the request for reception of the page setting information is stopped in a case that the page setting information corresponding to a predetermined number of pages has been precedingly received.

17. A non-transitory recording medium storing a computer readable program executed by an image forming apparatus including:
   a receiver that receives print data including image information and page setting information that specifies a paper feed tray of sheets on which the image information is to be printed from an external apparatus;
   a first memory that stores the image information;
   a second memory that stores the page setting information, wherein a page capacity of the second memory is larger than a page capacity of the first memory;
   an image forming device that forms an image on each of the sheets based on the image information read from the first memory;
   a plurality of paper feed trays that accommodate the sheets; and
   a conveyer that conveys the sheets from the paper feed tray to the image former forming device in a side-by-side aligned manner in a conveyance direction, between the image forming device and the paper feed tray that is farthest away from the image forming device,
   the computer readable program causing a computer to perform:
      receiving the page setting information in the print data of a next page;
      storing the page setting information in the second memory at a time of receiving the print data of the next page from the external apparatus when the first memory has no area to store the image information of the next page; and
      controlling the conveyer to feed out the sheets from the paper feed tray specified by the page setting information to the conveyance path of the conveyer and to convey the sheets when the page setting information for a next sheet is in the second memory, regardless of whether the image information corresponding to the page setting information is in the first memory.

18. The non-transitory recording medium storing a computer readable program according to claim 17, wherein in the receiving, the image information in the print data of the next page is rejected at the time of receiving the print data of the next page from the external apparatus, when the first memory has no area to store the image information of the next page in the first memory.

19. The non-transitory recording medium storing a computer readable program according to claim 18, wherein in the receiving, after refusing to receive the image information, the external apparatus is notified of a request for reception of the page setting information of the remaining pages including the page that is refused to be received regardless of an area status of the first memory.

20. The non-transitory recording medium storing a computer readable program according to claim 19, wherein in the receiving, when there is a next job after receiving the page setting information of all the remaining pages of a job including the refused page, the external apparatus is notified of the request for reception of the page setting information related to the next job regardless of the area status of the first memory.

21. The non-transitory recording medium storing a computer readable program according to claim 19, wherein in the receiving, the notification of the request for reception of the page setting information is stopped in a case that the page setting information corresponding to a predetermined number of pages has been precedingly received.

22. The non-transitory recording medium storing a computer readable program according to claim 17, causing the computer to further perform transmitting a first request for acquisition of the image information to the external apparatus when an area to store the image information of a new page is emerged in the first memory in a state where the image information that corresponds to the page setting information in the second memory has not been received.

23. The non-transitory recording medium storing a computer readable program according to claim 22, wherein in the transmitting, a second request for acquisition is transmitted to the external apparatus when an area to store the image information of a next new page exists in the first memory after the image information corresponding to the first request for acquisition is stored and the state continues.

24. The non-transitory recording medium storing a computer readable program according to claim 17, wherein in the receiving, when
   upon receiving the print data from the external apparatus, in a case where the first memory has an area to store the image information of the page corresponding to the received page setting information, the external apparatus is notified that the image information of the page is acceptable and receives the image information of the page from the external apparatus, and
   upon receiving the print data from the external apparatus in a case where the first memory has no area to store the image information of the page corresponding to the received page setting information, the external apparatus is notified of refusal to receive the image information of the page.

* * * * *